Jan. 21, 1969  EIICHI KAWAI ET AL  3,423,633
HEAD LAMP SYSTEM WITH PHOTOELECTRIC SWITCHING AND
TIME DELAY EXTINGUISHING
Filed May 27, 1966
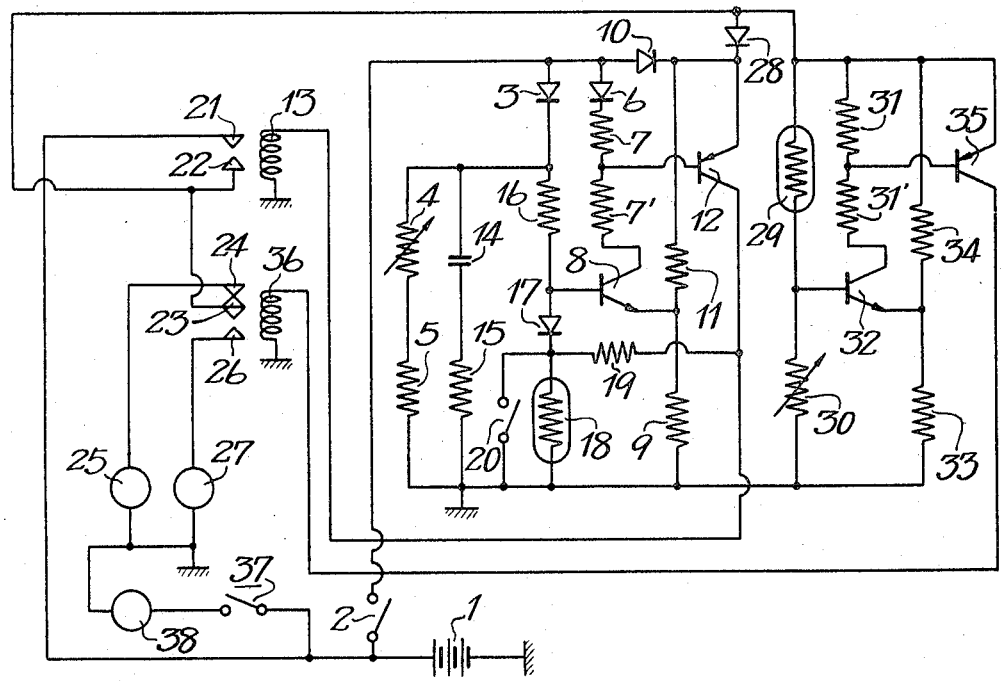
INVENTORS
EIICHI KAWAI
BY MASASHI OKADA
Linton and Linton
ATTORNEYS

United States Patent Office 3,423,633
Patented Jan. 21, 1969

3,423,633
HEAD LAMP SYSTEM WITH PHOTOELECTRIC SWITCHING AND TIME DELAY EXTINGUISHING
Eiichi Kawai and Masashi Okada, Kariya-shi, Aichi-ken, Japan, assignors to Nippon Denso Kabushiki Kaisha, Kariya-shi, Aichi-ken, Japan
Filed May 27, 1966, Ser. No. 553,359
Claims priority, application Japan, Dec. 23, 1965, 40/79,419
U.S. Cl. 315—83
Int. Cl. B60q 1/02
5 Claims

ABSTRACT OF THE DISCLOSURE

An automobile headlight control system is provided for cars having a high beam lamp and a low beam lamp, and particular provision is made for keeping the low beam lamp lighted for a few moments after the main lighting switch has been turned off when the car is being parked in a garage at night. Thus, the driver has a lighted garage to walk through after he has left the car. Two photoconductive elements are provided one of which is responsive to light reflected from garage walls, and the other of which is responsive to light from an approaching car. These elements through transistors and blocking diodes control relays which selectively energize the high beam lamp or the low beam lamp. A condenser maintains a holding current for a short time after the main lighting switch has been turned off and the length of this time can be varied by adjusting a variable resistor. When another car is approaching in the opposite direction, its light acts on one of the photoconductive elements which initiates a current which extinguishes the high beam lamp and starts up the low beam lamp. In garage parking at night, the ambient light in the garage acts on the other photoconductive element which initiates a current which through the condenser keeps the low beam lamp lighted for a few moments after the main lighting switch has been turned off.

---

This invention relates to improvements in a headlight system for the automotive car.

Heretofore, in accordance with the prior art, in garaging operation at night, the head light is put out instantaneously by switching off a key switch. The headlight usually comprises an upper high beam lamp and a lower position directed low beam lamp. It may become pitch-dark inside the garage so that any action after extinguishing the headlight and getting off is inconvenient and, sometimes, dangerous. Also in accordance with the prior art, when the dusk gathers between lighting the headlight and putting out the headlight, by closing a key switch, a pulse voltage is generated in an automatic headlight lighting means, which may cause the headlight to light erroneously, and the headlight is then left to be on.

An automatic means for maintaining the headlight on for several seconds to about two minutes, after the key switch has been cut off, has been proposed for avoiding the instantaneous putting out of the headlight. However, this means keeps the high beam lamp on but the low beam lamp off, so that the illumination is excessively bright. If it is attempted to light the low beam lamp by changing over from the high beam lamp, it is inevitable that the operation becomes complicated.

One object of this present invention is to provide a headlight system which is automatically prevented from such an erroneous performance derived from a pulse voltage generated by closing the key switch at evening, particularly at twilight.

Another object of this present invention is to provide a headlight system in which the high beam lamp of the headlight is automatically changed to the low beam lamp thereof for garaging operation at night.

Still another object of this invention is to provide a headlight system in which the low beam lamp which has been changed as above for garaging, is automatically maintained on for a while after the key switch has been opened.

Further another object of this present invention is to provide a headlight system in which transistor control circuits are employed but no particular transistor is required for the automatic light holding action after the key switch has been opened, but a transistor provided for the automatic means for maintaining the headlight on serves additionally for the above action to keep the light on, so that the system may be maintained economically.

Briefly stated, in accordance with one aspect of this invention, there is provided an automatic headlight control system comprising an automatic headlight lighting means and an automatic headlight change-over means, said automatic headlight lighting means comprising a photoconductive element, an input transistor, and a charging and discharging condenser having a large capacity interposed between the base of said input transistor and the earth, a charging and discharging circuit having a short charging time and a long discharging time being formed across said charging and discharging condenser, diodes for preventing reverse currents, and resistances, and said automatic headlight change-over means being joined with said automatic headlight lighting means.

The present invention will be better understood from the following description, together with the accompanying sole figure of the drawing forming a part thereof, which is a wiring diagram embodying this invention.

Referring more particularly to the drawing, the preferred embodiment of this present invention will now be described; however, this description will be understood to be illustrative of the invention and not as limiting it to the particular arrangement shown and described.

There is a battery 1 of which the negative electrode is directly earthed and the positive electrode is connected to one terminal of a key switch 2 of which the other terminal is connected to one terminal of a diode 3 for preventing reverse current whose other terminal is connected to, a variable resistance 4 for adjusting condenser discharge time constant, and a fixed resistance 5 in series. The other terminal of the key switch 2 is connected also to a diode 6 whose other terminal is connected in series to one terminal of resistances 7 and 7', and to the collector of an input transistor 8, whose emitter is connected to a resistance 9. The terminal of switch 2 remote from the battery is further connected to one terminal of a diode 10 whose other terminal is connected in series to a resistance 11, and the above resistance 9. The anode side of the diode 10 for preventing reverse current is connected to the emitter an emitter of an output transistor 12, whose collector is connected to the actuating winding of a relay winding 13.

The anode side of the diode 3 for preventing reverse current referred to hereinbefore is connected to one terminal of a charging and discharging condenser 14 having a large capacity, whose other terminal is connected to one terminal of a charging resistance 15 of a small value. The anode side of diode 3 is further connected to one terminal of a resistance 16 for adjusting base current of transistor 8 and to one terminal of a diode 17 for preventing reverse current, and a photoconductive element 18, in series. The photoconductive element 18 is responsive to the ambient light.

The base of the input transistor 8 is connected with the cathode side of the diode 17 for preventing reverse current. The base current of the transistor 8 is controlled by the resistance 16. The base of the output transistor 12 is connected with the common point of the resistance 7 with the resistance 7'. A feedback resistance 19 is connected between the collector of the output transistor 12 and the anode side of the diode 17.

An automanual change-over switch 20 is connected in parallel with the photoconductive element 18. The automanual switch 20 is opened during the automatically operative state of the system and closed during the manually operative state.

Reference numeral 21 represents a movable relay armature switch blade which is adapted to be displaced by the relay winding 13 and is connected with the positive electrode of the battery 1. A fixed contact 22 of relay 13 is engageable with the above movable switch blade 21 and is connected with a high beam lamp 25 of the headlight across a movable armature relay blade 23 and a fixed relay contact 24 of a relay having an actuating winding 36. A fixed relay contact 26 of relay 36 adapted to be contacted with the movable switch blade 23, being displaced from the fixed relay contact 24, is connected with a low beam lamp 27 of the headlight.

One terminal of high beam lamp 25 and one terminal of low beam lamp 27 are grounded. The undergrounded terminal of the high beam lamp 25 is connected through relay contacts 24, 23, to diode 28 and the emitter of the output transistor 12 for preventing reverse current. Reference numeral 29 represents a photoconductive element whose resistance varies in response to a quantity of light of an opposed approaching car and which is provided for controlling a change-over from the high beam lamp 25 to the low beam lamp 27. Photoconductive element 29 may also be actuated by light reflected from the walls of the garage.

The positive electrode of the photoconductive element 29 is connected with the fixed relay contact 22 of the relay 13 and the negative electrode of element 29 is connected to a variable resistance 30 for adjusting the cut-over sensitivity. The positive electrode of the photoconductive element 29 is further connected in series to fixed resistances 31 and 31', a collector an input of transistor 32, whose emitter is connected to the fixed resistance 33. A fixed resistance 34 is connected between the positive electrode of the photoconductive element 29 and the fixed resistance 33. The positive electrode of the photoconductive element 29 is further connected to the emitter of an output transistor 35 whose collector is connected to relay winding 36 which displaces the movable switch blade 23. The base of the output transistor 35 is connected with the common point of fixed resistance 31 which is connected in series with the fixed resistance 31'.

In operation, at first the key switch 2 is closed for energizing the headlight provided that the time is night. Now normally the automanual change-over switch 20 is then open for the automatic state, so that a circuit is closed comprising the positive electrode of the battery 1 having the earthed negative electrode, the closed key switch 2, the diode 3 for preventing reverse current, the charging and discharging condenser 14, the charging resistance 15, and the earth, is energized by an impulse voltage generated by the on operation of the key switch 2 instantaneously on that instant, but the base of the input transistor 8 is not energized thereby. Therefore, the input transistor 8 is never energized at this instant accidentally.

Since the condenser charging resistance 15 is a low one, the charging and discharging condenser 14 is charged for an extremely short time (0.1 to 2 sec.). Then the condenser 14 becomes an extremely high impedance so that performance of the input transistor 8 is not affected thereby. When the resistance of the photoconductive element 18 is increased correspondingly due to reduction in the exterior illumination, as it becomes dark a balanced circuit comprising resistances 9, 11, and 16 and the photoconductive element 18 becomes unbalanced and a circuit comprising the battery 1, key switch 2, diode 3 for preventing reverse current, resistance 16 for adjusting transistor base current, base and emitter of the input transistor 8, resistance 9, and earth, is formed so that the above input transistor 8 is energized by the base current, and the emitter of the transistor 8 is connected to the collector thereof. At the same time, a circuit comprising the battery 1, key switch 2, diode 6, resistances 7 and 7', collector and emitter of the transistor 8, resistance 9, and earth is formed so that a potential difference is generated between the emitter and the base of the output transistor 12 by the resistance 7. By virtue of this, a circuit comprising the battery 1, key switch 2, diode 10, emitter and base of the output transistor 12, resistance 7', the collector and emitter of the input transistor 8, resistance 9, and earth is formed, so that the base of the output transistor 12 is energized, and, in turn, the emitter of the transistor 12 is connected to the collector thereof. Accordingly, a circuit comprising the battery 1, key switch 2, diode 10, emitter and collector of the transistor 12, relay winding 13, and earth is formed so as to energize the relay winding 13. When the relay winding 13 is energized, the movable switch armature switch blade 21 is attracted thereto so as to be brought into contact with the fixed contact 22. Upon closing this contact, the high beam lamp 25 is energized and illuminated by the battery 1 across the movable relay armature blade 21 and the fixed contact 22.

When the balanced circuit comprising the photoconductive element 29, variable resistance 30, and fixed resistances 33 and 34, becomes unbalanced due to the reduction in resistance of the photoconductive element 29, which corresponds to ambient light such as a light radiated from a headlight of an approaching opposed car, the input transistor 32 and output transistor 35 are brought into connected relation so that the circuit comprising the battery 1, movable armature blade 21, fixed contact 22, the emitter and collector of the output transistor 35, relay winding 36, and earth is energized. When the relay winding 36 is energized, the movable armature blade 23 is displaced, being displaced from the fixed contact 24, and is displaced toward the fixed contact 26. By virtue of this change-over, the high beam lamp 25 is put out and, at the same time, the low beam lamp 27 is turned on.

In garaging operation at night, the light beam of the high beam lamp 25 is reflected by a wall of the garage or the like so as to shine upon the photoconductive element 29. When the photoconductive element 29 is thus lighted up, the same acts similarly to the above-stated case, so that the high beam lamp 25 replaces the low beam lamp 27. When a driver intends to depart from the car and cut the key switch 2, the charge in the charging and discharging condenser 14 flows through the resistance 16, the base and emitter of the input transistor 8, resistance 9, and the resistance 15 as a current so as to supply a base current to the base of the input transistor 8 which is brought into a conducting state. At the same time, a circuit comprising the battery 1, movable relay armature blade 21, fixed contact 22, diode 28, the emitter and base of the output transistor 12, resistance 7', the collector and emitter of the input transistor 8, resistance 9, and earth, is formed so as to supply a base current of the output transistor 12. Therefore, the transistor 12 is maintained in the conducting state for a while. Accordingly, the relay winding 13 is energized so that the low beam lamp 27 is kept on. By virtue of this low beam lamp 27 being kept on, the driver may depart from the garage at ease.

After a while, when the energizing current of the relay winding 13 drops down to a value below that which is required for holding the movable armature blade 21, the movable armature blade 21 is separated from the fixed contact 22 so as to put out the low beam lamp 27. In order to adjust the automatic holding time of the headlight, the resistance of the variable resistance 4 may be manually varied.

Further, the charge in the charging and discharging condenser 14 tends to flow through a circuit comprising the variable resistance 4, and the resistance 15, and through another circuit comprising the resistance 16, diode 17, photoconductive element 18, and the resistance 15. In these cases, the diodes 3, 6, 10, 17, and 28 serve to prevent these circuits from being traversed by reverse currents.

In case when both lamps the high beam lamp 25 and the low beam lamp 27 of the headlight are intended to be put out, for example, when the car is parked at night, the automanual change-over switch 20 is closed. When the change-over switch 20 is closed, the potential difference between the two ends of the photoconductive element 18 becomes instantaneously zero so that both the high beam lamp 25 and the low beam lamp 27 of the headlight are extinguished. This is similar to such a case where the exterior illumination becomes higher than a given value. Then, a parking lamp 38 may be lighted by closing a parking lamp switch 37 manually.

Further, a tail lamp has not been referred to hereinbefore. Now it is possible to light the tail lamp during the automatically lighting state: it is possible to light the tail lamp together with either the high beam lamp 25 or the low beam lamp 27, by means of inserting the tail lamp between the fixed relay contact 22 and the earth.

Whereas certain modifications of the invention have been illustrated for purposes of description, it is to be understood that the invention is not to be limited to such a form but only within the scope of the appended claims.

What is claimed as new and desired to be secured by Letters Patent of the United States is:

1. In an automatic headlight control system, a first photoconductive element adapted to be responsive to ambient brightness, a second photoconductive element adapted to be responsive to a beam from an approaching car, a first input transistor and a first output transistor connected in series, a second input transistor and a second output transistor connected in series, a high beam lamp, a low beam lamp, a first single pole single throw relay having an actuating winding, a second single pole double throw relay having an actuating winding, the collector of said first output transistor being connected to the actuating winding of said first relay, the collector of said second output transistor being connected to the actuating winding of said second relay, one contact of said first relay being connected to one terminal of said second photoconductive element, the fixed contacts of said second relay being respectively connected to said high beam lamp and said low beam lamp, the armature of said second relay being connected to one terminal of said second photoconductive element, the base of said first input transistor being connected to one terminal of said first photoconductive element, a condenser of large capacity connected across said first photoconductive element, a battery, a manually operable switch having one terminal connected to said battery, the other terminal of said manually operable switch being connected to the collectors of said first input transistor and said second input transistor, and to the emitters of said first output transistor and said second output transistor, a plurality of resistances connected in series and in parallel with said condenser, resistances connected in the base circuits of said transistors, and diodes interposed in the circuits of said first input transistor and said second input transistor and said first photoconductive element for limiting the currents through said last named circuits to unidirectional currents, one terminal of said condenser being connected to the base of said first input transistor.

2. An automatic headlight control system according to claim 1, and an auto-manual change-over switch connected across said first photoconductive element.

3. An automatic headlight control system according to claim 1, the terminals of said first photoconductive element being respectively connected to the base of said first input transistor and one terminal of said battery.

4. An automatic headlight control system according to claim 1, and a connection from one terminal of said second photoconductive element to the base of said second input transistor.

5. An automatic headlight control system according to claim 1, and two balanced auxiliary circuits respectively for said first input transistor and said first output transistor, and for said second input transistor and for said second output transistor, said balanced circuits being each formed by connecting the base of each said output transistor with the collector of its input transistor, and by inserting balancing resistances respectively in the leads of the base of each said input transistor and in the leads of the emitter of each input transistor.

References Cited

UNITED STATES PATENTS

| 2,939,052 | 5/1960 | Matkins | 315—83 X |
| 2,963,622 | 6/1960 | Thomson et al. | 315—83 |
| 3,132,252 | 5/1964 | Engelmann | 315—83 X |

FOREIGN PATENTS 706,515  3/1965  Canada.

JAMES W. LAWRENCE, *Primary Examiner.*

C. R. CAMPBELL, *Assistant Examiner.*

U.S. Cl. X.R.

315—154, 155, 159; 250—208, 214; 317—127, 148.5